(12) United States Patent
Natsume et al.

(10) Patent No.: US 7,946,743 B2
(45) Date of Patent: May 24, 2011

(54) VEHICLE LAMP ASSEMBLY

(75) Inventors: Kazunori Natsume, Shizuoka (JP); Kenji Nobuhara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 349 days.

(21) Appl. No.: 12/334,128

(22) Filed: Dec. 12, 2008

(65) Prior Publication Data
US 2009/0154186 A1   Jun. 18, 2009

(30) Foreign Application Priority Data
Dec. 14, 2007   (JP) .................................. 2007-322737

(51) Int. Cl.
F21V 1/00 (2006.01)
F21V 9/00 (2006.01)
F21V 7/00 (2006.01)
(52) U.S. Cl. .................... 362/516; 362/509; 362/511
(58) Field of Classification Search .............. 362/509, 362/511, 516
See application file for complete search history.

(56) References Cited

U.S. PATENT DOCUMENTS

| | | | | |
|---|---|---|---|---|
| 6,102,559 A | * | 8/2000 | Nold et al. | 362/558 |
| 6,846,100 B2 | * | 1/2005 | Imazeki et al. | 362/517 |
| 6,948,840 B2 | * | 9/2005 | Grenda et al. | 362/555 |
| 7,278,768 B2 | * | 10/2007 | Gasquet | 362/539 |
| 7,410,280 B2 | * | 8/2008 | Erber | 362/520 |
| 2003/0193815 A1 | | 10/2003 | Mishimagi | |
| 2004/0130904 A1 | | 7/2004 | Yamada et al. | |
| 2005/0248955 A1 | | 11/2005 | Nishizawa et al. | |
| 2006/0146555 A1 | | 7/2006 | Inaba | |
| 2006/0193144 A1 | * | 8/2006 | Braeutigam et al. | 362/493 |

FOREIGN PATENT DOCUMENTS

| | | |
|---|---|---|
| DE | 103 41 103 A1 | 3/2004 |
| EP | 1 835 224 A1 | 9/2007 |
| JP | 2006-236588 A | 9/2006 |

OTHER PUBLICATIONS

European Search Report for European Application No. 08021620.3-2423 dated May 3, 2010, 6 pages.
English abstract of JP2006236588 published Sep. 7, 2006, esp@cenet database, 1 page.

* cited by examiner

Primary Examiner — Jong-Suk (James) Lee
Assistant Examiner — David J Makiya
(74) Attorney, Agent, or Firm — Osha • Liang LLP

(57) ABSTRACT

A vehicle lamp assembly includes a first lamp section and a second lamp section, which are disposed inside a lamp chamber defined by a lamp body and a front cover. The first lamp section includes a light source and a reflector which reflects light from the light source. The second lamp section includes a first light emitting device, a second light emitting device, a light guide member, and an optical component. The light guide member includes a base end face from which the light guide member extends in a strip shape along the front cover, a functional portion having a diffusing front surface which emits light from a first light emitting device, and a decorative portion having an internally reflecting rear surface which reflects light from a second light emitting device. A light emitting area of the decorative portion is larger than that of the functional portion. The optical component is disposed on a rear side of the functional portion to guide the light from the first light emitting device toward the diffusing front surface. The light emitted from the second light emitting device is incident on the base end face.

19 Claims, 9 Drawing Sheets

VEHICLE LAMP ASSEMBLY

BACKGROUND OF INVENTION

1. Field of the Invention

The present invention relates to a vehicle lamp assembly having a first lamp section and a second lamp section. The first and second lamp sections provide different light distributions, and are both accommodated inside a single lamp chamber. Such a lamp assembly may be an automotive headlamp assembly having a clearance lamp and a turn signal lamp, or an automotive indicating lamp assembly having a tail lamp and a stop lamp. More specifically, the present invention relates to such a vehicle lamp assembly, the second lamp section of which has a light emitting device and a light guide member which emits light from the light emitting device.

2. Related Art

JP 2006-236588 A describes a related-art headlamp assembly including a lamp body, a front cover which forms a lamp chamber together with the lamp body, a headlamp section, and a clearance lamp section. The headlamp section and the clearance lamp section are both accommodated inside the lamp chamber. The headlamp section includes a projector-type light source unit which provides headlamp light distribution. The projector-type light source unit has a projection lens, a shade, a light source, and a reflector. The clearance lamp section includes a light guide member which provides clearance lamp light distribution. The light guide member has a plate-shaped base portion and an apron portion which downwardly extends from a horizontal front edge of the base portion. The base portion and the apron portion are formed in a one-piece structure. The headlamp further includes an extension which surrounds the projector-type light source unit. The extension has a forwardly extending horizontal portion, and the light guide member is arranged to be substantially level with a front end portion of the forwardly extending horizontal portion. The clearance lamp section further includes a plurality of first LEDs laterally arranged on a rear side of a laterally extending rear end face of the base portion, and a plurality of second LEDs laterally arranged on a rear side the laterally extending apron portion. The apron portion is formed with cylindrical steps. Light from the plurality of second LEDs is primarily emitted from the apron portion to provide the clearance lamp light distribution. A lower surface of the base portion is formed with stippled dots (an internally reflecting region), and light from the plurality of first LEDs is uniformly emitted from the entire base portion.

SUMMARY OF INVENTION

The related art described above was recognized to include one or more of the following aspects.

First, a width of the light guide member is large. Accordingly, a light emitting area of the light guide member (i.e., the apron portion and the base portion) is also large. Therefore, many LEDs are necessary, which leads to an increase in cost.

Second, the light guide member extends in a front-and-rear direction inside the lamp chamber. Therefore, the configuration of the related art is difficult to employ in a lamp having a small front-and-rear depth.

Third, while the light emission from the apron portion is visually recognizable for oncoming drivers or pedestrians, the light emission from the base portion is hardly recognized by oncoming drivers or pedestrians because the light emitting surface of the base portion is upwardly oriented. Therefore, visibility of the clearance lamp is low.

One or more embodiments of the present invention address one or more of the issues described above.

According to an aspect of one or more embodiments of the present invention, a vehicle lamp assembly is provided. The vehicle lamp assembly includes a lamp body, a front cover which forms a lamp chamber together with the lamp body, a first lamp section having a light source and a reflector which reflects a light from the light source, and a second lamp section having a first light emitting device, a second light emitting device, a light guide member, and an optical component. The first lamp section and the second lamp section are disposed inside the lamp chamber. The light guide member includes a base end face from which the light guide member extends in a strip shape along the front cover, a functional portion having a diffusing front surface which diffusely emits light from the first light emitting device, and a decorative portion having an internally reflecting rear surface which reflects light from the second light emitting device toward the front cover. A light emitting area of the decorative portion is larger than a light emitting area of the functional portion. The optical component is disposed on a rear side of the functional portion to guide the light from the first light emitting device toward the diffusing front surface. The second light emitting device is disposed such that the light emitted therefrom is incident on the base end face of the light guide member.

Other aspects and advantages of the invention will be apparent from the following description, the drawings, and the claims.

DETAILED DESCRIPTION

Hereinafter, embodiments of the present invention will be described in detail with reference to the drawings.

First Embodiment

FIGS. 1 to 6 illustrate an automotive headlamp assembly according to a first embodiment of the invention.

Figure 1:
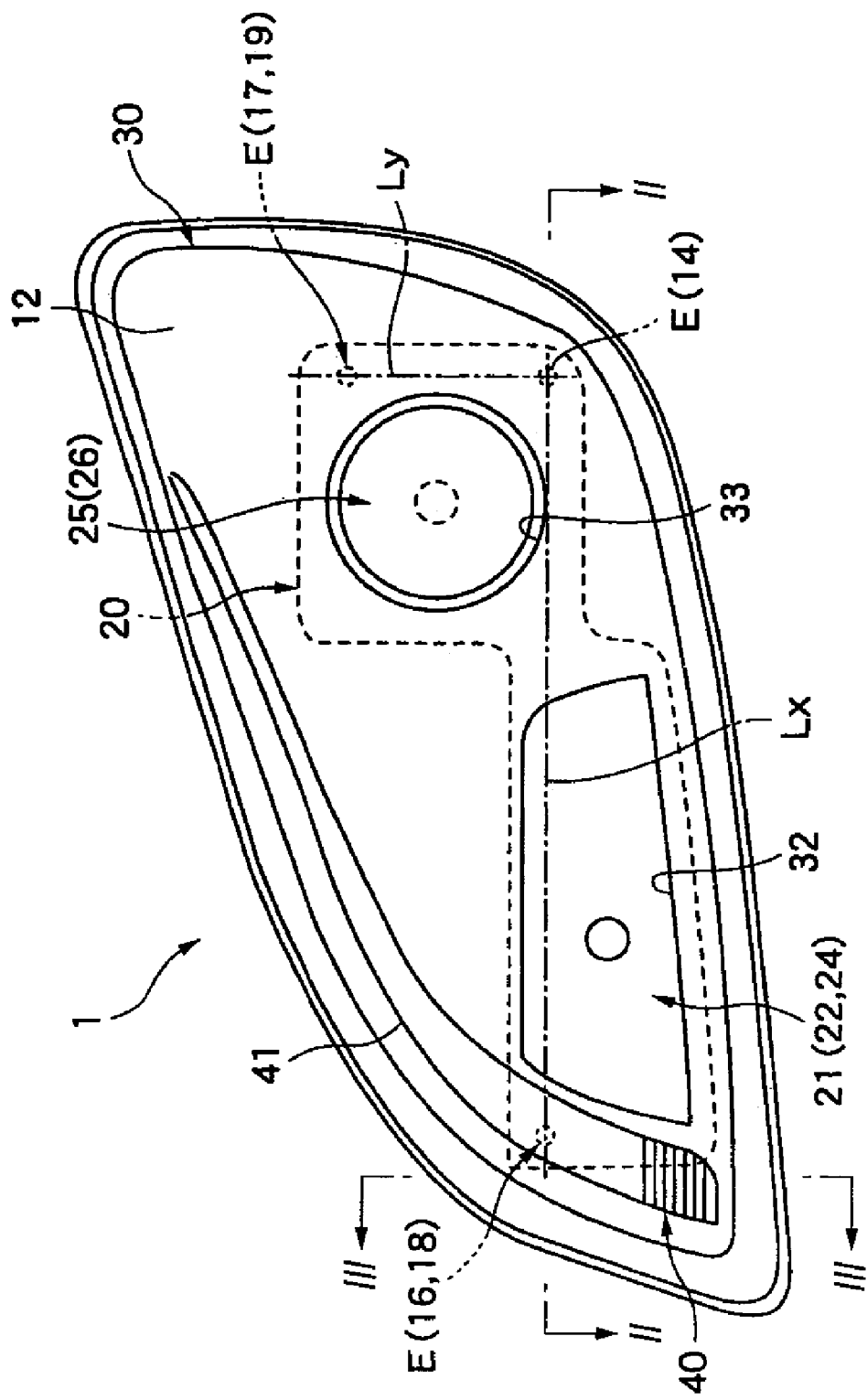
FIG. 1 is a front view of an automotive headlamp assembly according to a first embodiment of the invention.
Figure 2:
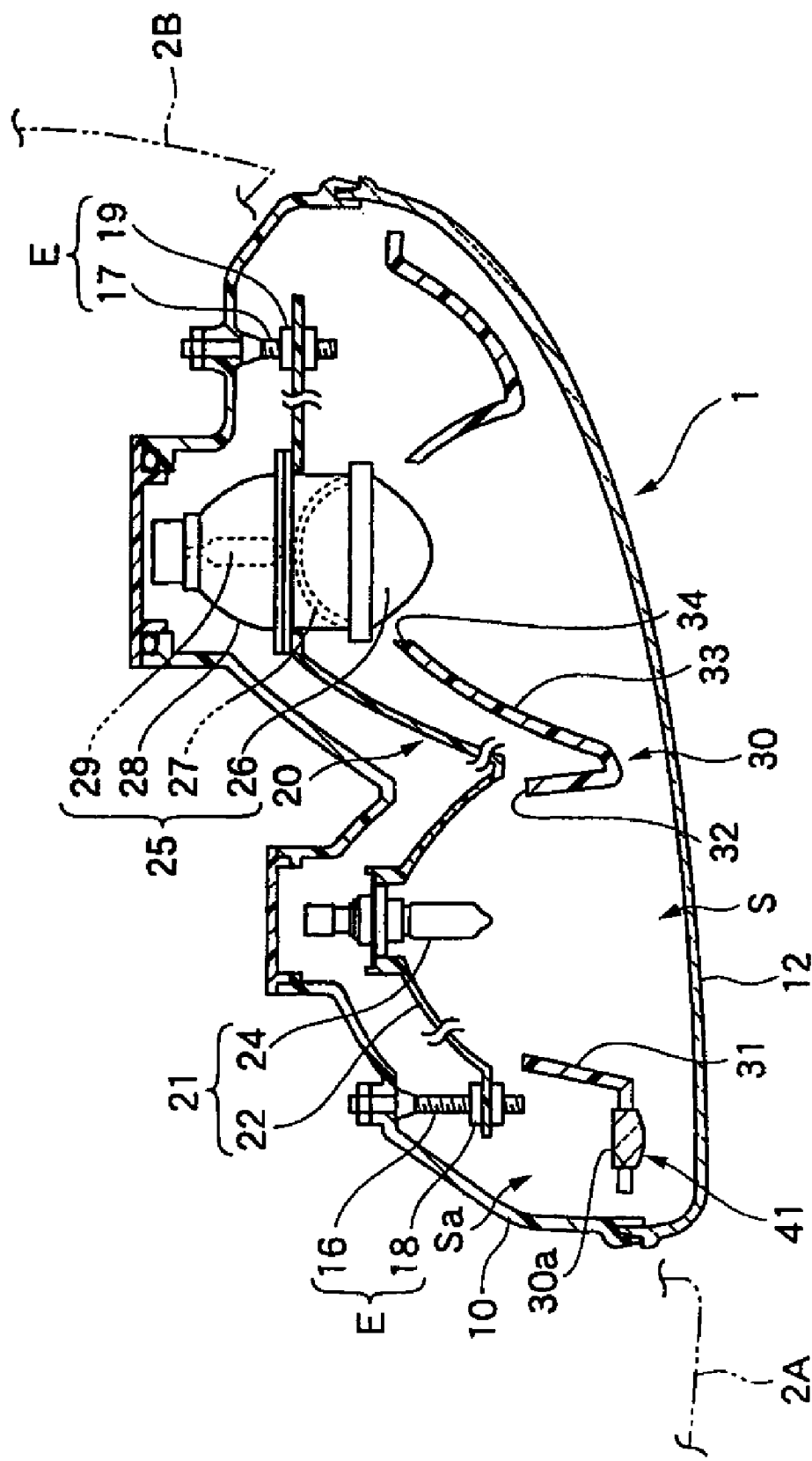
FIG. 2 is a horizontal sectional view of the headlamp assembly taken along the line II-II of FIG. 1.

As shown in FIGS. 1 and 2, the automotive headlamp assembly 1 has a lamp body 10 and a transparent front cover 12 which together form a lamp chamber S. A front opening of the lamp body 10 and the front cover 12 extend from a front end portion 2A of a vehicle body and curve toward a side portion 2B of the vehicle body. That is, the front opening of the lamp body 10 and the front cover 12 are rearwardly inclined in a horizontal section, whereby the lamp chamber S is also curved from the front to the side of the vehicle body. In FIG. 1, interior components which can be visually seen through the front cover 12 from the front are illustrated in solid lines.

The headlamp assembly includes a headlamp section 20 and a clearance section 40 which are both accommodated inside the lamp chamber S.

The headlamp section 20 is tiltable in vertical and horizontal directions through an aiming mechanism E. The headlamp section 20 includes a reflector-type light source unit 21 and a projector-type light source unit 25, which are connected together.

The reflector-type light source unit 21 is arranged on an inner side of the projector-type light source unit 25 with respect to a widthwise direction of the vehicle body. The reflector-type light source unit 21 has a reflector 22 formed with an attaching hole, and a halogen bulb 24 inserted into the attaching hole. The reflector-type light source unit 21 is configured to irradiate an upper beam (i.e., a driving beam). The projector-type light source unit 25 has a projection lens 26, a cut-off line forming shade 27, an elliptical reflector 28, and a halogen bulb 29. The projector-type light source unit 25 is configured to irradiate a lower beam (i.e., a passing beam).

The aiming mechanism E includes a pair aiming screws 16, 17 which penetrate through the lamp body 10 and forwardly protrudes therefrom, a pair of aiming nuts 18, 19 into which the corresponding aiming screws 16, 17 are respectively inserted, and a ball joint 14 which is disposed between the lamp body 10 and the headlamp section 20 right below the aiming nut 19. The aiming nuts 18, 19 are attached to lateral edge portions of the headlamp section 20 respectively. The aiming screw 16 serves as a horizontal aiming screw which tilts the headlamp section 20 (i.e., tilts optical axes of the reflector-type light source unit 21 and the projector-type light source unit 25) around a vertical tilting axis Ly which passes through the ball joint 14 and the aiming nut 19. The aiming screw 17 serves a vertical aiming screw which tilts the headlamp section 20 (i.e., the optical axes of the reflector-type light source unit 21 and the projector-type light source unit 25) around a horizontal tilting axis Lx which passes through the ball joint 14 and the aiming nut 18.

Figure 3:
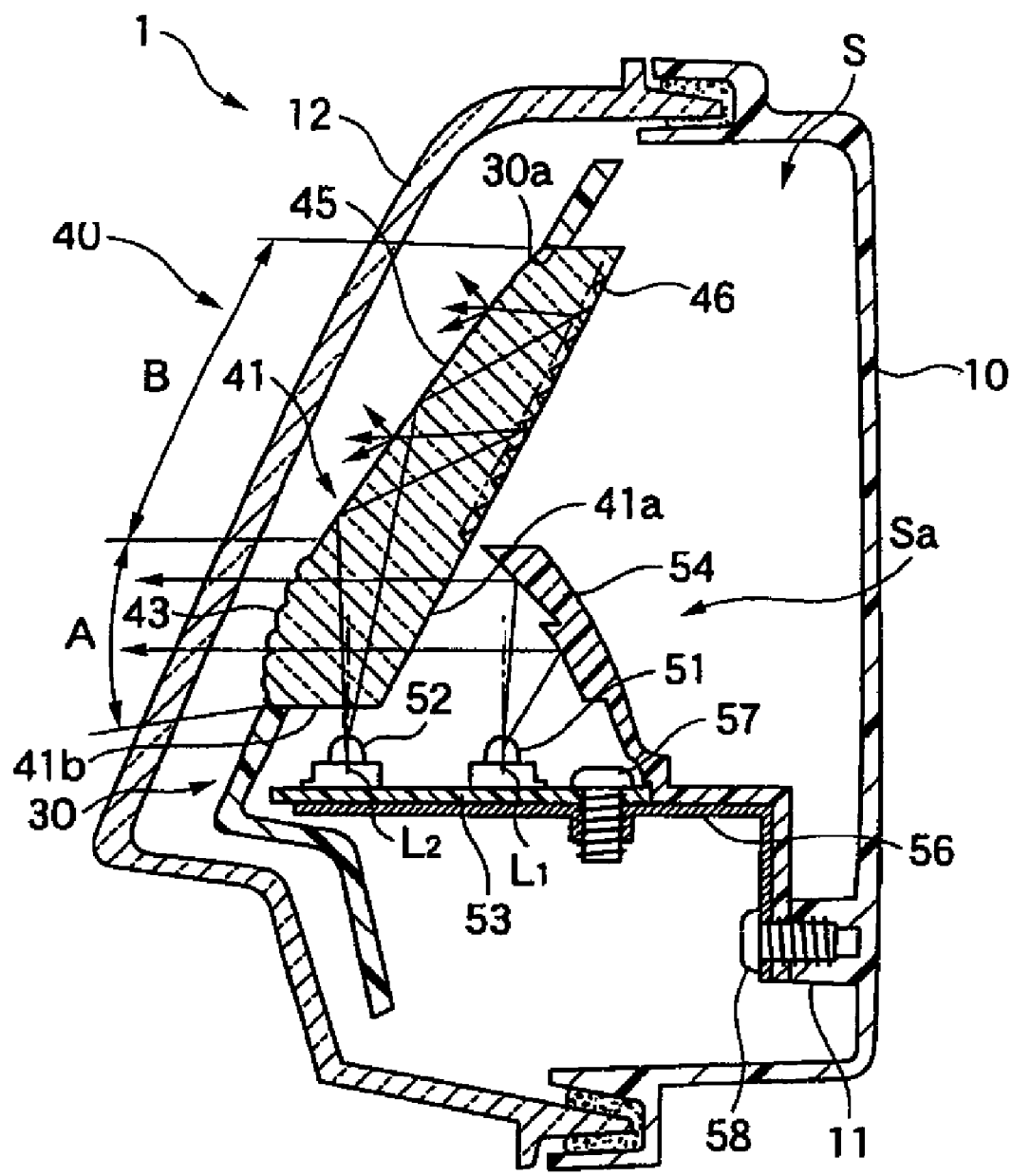
FIG. 3 is a vertical sectional view of the headlamp assembly taken along the line III-III of FIG. 1.
Figure 4:
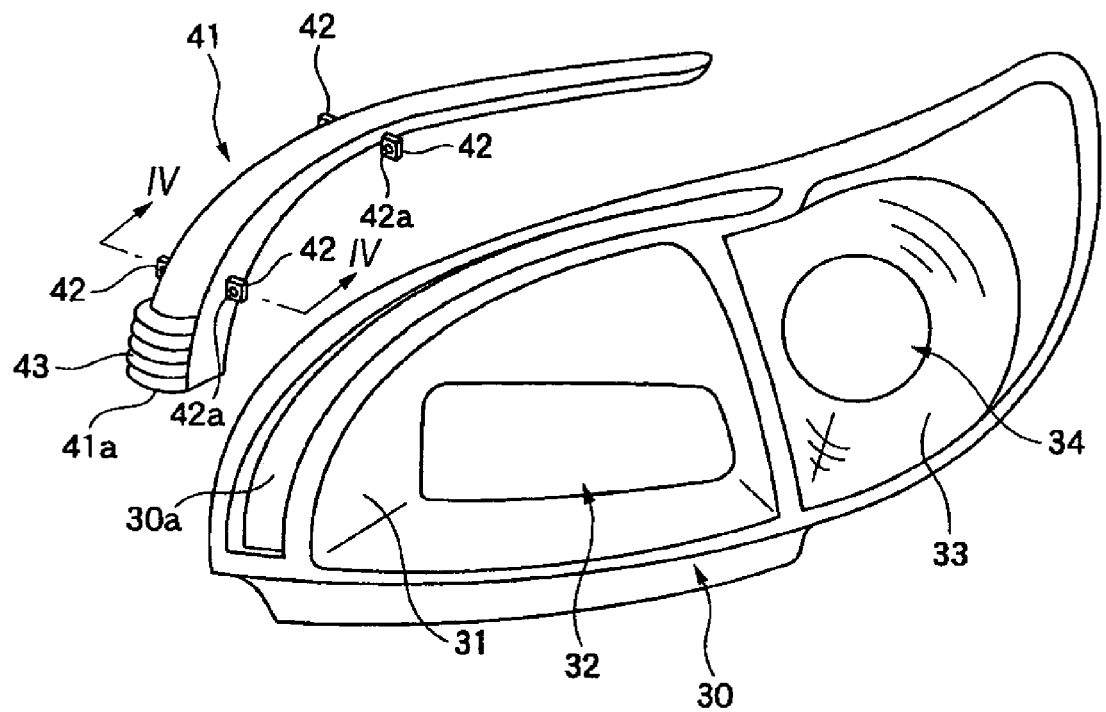
FIG. 4 is a front perspective view of an extension and a light guide member.

An extension 30 is arranged on a front side of the headlamp section 20 inside the lamp chamber S in order to cover a space between the lamp body 10 and the reflector-type light source unit 21 and a space between the lamp body 10 the projector-type light source unit 25. A surface of the extension 30 is treated with an aluminum deposition. As shown in FIGS. 2 to 4, an outer shape of the extension 30 follows the front opening of the lamp body 10, and is positioned inside the lamp chamber S, for example, by being held between the lamp body 10 and the front cover 12.

The extension 30 has a rectangular cylindrical portion 31 and a circular cylindrical portion 33 which are rearwardly extended. A rear end portion of the rectangular cylindrical portion 31 is formed with a rectangular opening 32 corresponding to the reflector 22 of the reflector-type light source unit 21, and a rear end portion of the circular cylindrical portion 33 is formed with a circular opening 34 corresponding to the projection lens 26 of the projector-type light source unit 25.

As shown in FIGS. 1 and 4, the extension 30 is formed with an opening 30a extending, in a strip shape, from an inner side edge portion to a middle of an upper side edge portion of the extension 30. The clearance lamp section 40 has a light guide member 41 which is integrally attached into the opening 30a. The light guide member 41 is made of transparent synthetic resin, and is formed into a strip shape corresponding to the opening 30a.

Figure 5:
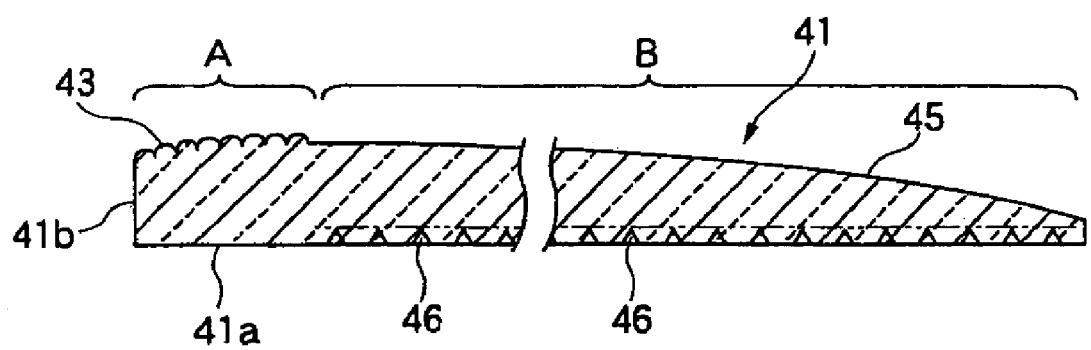
FIG. 5 is a longitudinal sectional view of the light guide member taken along plane parallel to a direction in which the light guide member extends.
Figure 6:
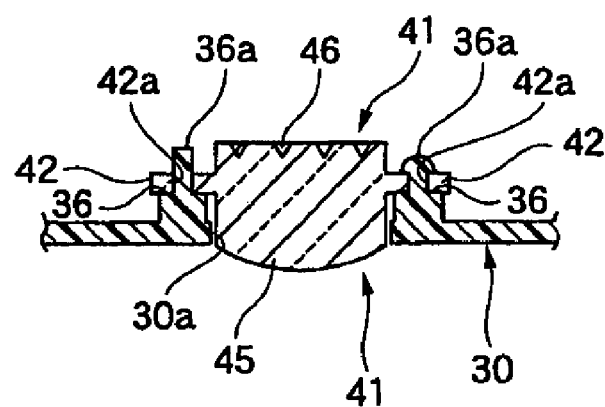
FIG. 6 is a sectional view of the light guide member taken along the line IV-IV of FIG. 4, illustrating how the light guide member is fixed to the extension.

As shown in FIGS. 1 and 5, the light guide member 41 is configured such that, from a base end portion, which is the lowermost portion toward a tip end portion which is on an opposite side of the base end portion, in an extending direction of the light guide member 20, a width of the light guide member 20 gradually becomes narrower and a thickness of the light guide member 20 gradually becomes thinner. As shown in FIGS. 4 and 6, pairs of right and left brackets 42, each formed with a circular hole 42a, are protruded from two locations in a longitudinal direction of the light guide member 41.

The opening 30a of the extension 30 is formed in such a size that the light guide member 41 is engageable therein, and mounting bases 36 are provided on a rear surface of the extension 30 near a circumferential edge of the opening 30a. Each of the mounting bases has a boss 36a configured to be engageable into the corresponding one of the circular holes 42a of the brackets 42 of the light guide member 41. As shown in FIG. 6, the light guide member 41 is fitted into the opening 30a from a rear side of the extension 30 such that the circular holes 42a of the brackets 42 engage with the respective bosses 36a of the mounting bases 36, whereby the four brackets 42 contact against the respective mounting bases 36 and a front surface of the extension 30 around the opening 30a and a front surface of the light guide member 41 become substantially flush with each other. Thereafter, each of the bosses 36a is welded to the corresponding bracket 42 by thermal caulking, whereby the light guide member 41 and the extension 30 are integrally fixed together.

A front surface of the light guide member 41 is formed in an arcuate shape when seen in a cross section (see FIG. 6) along the entire length in the longitudinal direction thereof. As shown in FIGS. 3 and 5, moreover, a portion of the front surface of the light guide member 41 (i.e., a diffusing front surface of the light guide member 41) is formed with cylindrical steps 43 which vertically diffuse light emitting therefrom. The light diffused by cylindrical steps 43 is originally emitted from a first LED 51, and enters into the light guide member 41 from a rear surface of the base end portion of the light guide member 41 (i.e., a first light entering surface 41a of the light guide member 41).

The remaining portion 45 of the front surface of the light guide member 41, where the cylindrical steps 43 are not formed, is textured to have fine surface roughness. A portion of the rear surface of the light guide member 21 (an internally reflecting rear surface of the light guide member 41), which is on a rear side of the textured surface 45, is formed with densely stippled dots 46 which reflect light toward the textured surface 45. The light reflected by the stippled dots 46 is originally emitted from a second LED 52, and enters into the light guide member 21 from a base end face of the light guide member 41 (a second light entering surface 41b of the light guide member 41).

In other words, the light guide member 41 includes a functional portion A having the diffusing front surface formed with the cylindrical steps 43 from which the light emitted from the first LED 51 and entered into the first light entering surface 41a is diffusely emitted to provide a clearance lamp light distribution, and a decorative portion B having the internally reflecting rear surface formed with the stippled dots 46 which reflect the light emitted from the second LED 52 and entered into the second light entering surface 41b. The light reflected by the internally reflecting rear surface is uniformly emitted from the textured surface 45 on the front side thereof. A light emitting area of the decorative portion B is larger than a light emitting area of the functional portion A. This light guide member 41 is attached to the extension 30, and is disposed inside the lamp chamber S to extend in a strip shape along a circumferential edge of the lamp chamber S and along the front cover 12.

As shown in FIG. 3, a parabolic reflector 54 (an optical component) is disposed on a rear side of the functional portion A of the light guide member 41. The reflector 54 guides the light from the first LED 51 toward the diffusing front surface (i.e., toward the cylindrical steps 43) of the functional portion A. The first LED 51 is disposed right below the reflector 54 at a focal point of the parabolic shape of the reflector 54. The first LED 51 is oriented upward such that its light emitting axis L1 extends upward in a direction along which the light guide member 41 extends. In other words, the light emitting axis L1 of the first LED 51 is directed in an upward direction perpendicular to a front-and-rear direction of the headlamp assembly 1, i.e., perpendicular to optical axes of the reflector-type light source unit 21 and the projector-type light source unit 25. The light emitted from the first LED 51 is reflected by the reflector 54 to be substantially parallel light rays, i.e., collimated, and then enters into the light guide member 41 from the first light entering surface 41a, which is a portion of the rear surface of the light guide member 41. The light entering from the first light entering surface 41a is then emitted from the diffusing front surface (i.e., from the cylindrical steps 43) to be vertically and horizontally diffused light, whereby a light distribution of the clearance lamp section 40 is provided.

The second LED 52 is provided as a light source for illuminating the decorative portion B, and is disposed facing against the base end face (i.e., the second light entering surface 41b) of the light guide member 41. The second LED 52 is also oriented upward such that its light emitting axis L2 is directed in the upward direction perpendicular to the front-and-rear direction of the headlamp assembly 1, i.e., perpendicular to the second light entering surface 41b. The light emitting axis L2 of the second LED 52 is set to be parallel to the light emitting axis L1 of the first LED 51. The light emitted from the second LED 52 enters from the base end face (i.e., the second light entering surface 41b) of the light guide member 41, and is reflected by the stippled dots 46 on the rear surface of the light guide member 41 after being internally reflected inside the light guide member 41. The light reflected by the stippled dots 46 is then emitted from the textured surface 45 on the front of the light guide member 41 such that the light is diffused in various directions, whereby the entire decorative portion B is uniformly illuminated with relatively less light intensity.

As shown in FIG. 3, the first LED 51 and the second LED 52 are mounted on a single flat circuit board 53 so as to be adjacent to each other in the front-and-rear direction. The circuit board 53 is fixed to an L-shaped metallic (for example, aluminum) bracket 56, which has good heat conductance, with a screw 57. The bracket 56, with respect to which the LEDs 51, 52 are fixed, and the reflector 54 are fixed together to a boss 11, which inwardly protrudes from an inner surface of a back wall of the lamp body 10, with a screw 58.

The headlamp assembly 1 according to the first embodiment has one or more of the following advantages.

First, although a light guiding length of the light guide member 41 (i.e., the functional portion A and the decorative portion B) which extends along the circumferential edge of the lamp chamber S and along the front cover 12 in the strip shape is long, as compared with the plate-shaped light guide member of the related art, a light emitting rear in the widthwise direction of the light guide member 41 is narrower than the related art light guide member. Therefore, the two LEDs 51, 52 are sufficient to provide the light source for the clearance lamp section 40. Accordingly, cost of the headlamp assembly 1 can be reduced.

Second, the long light emitting surface of the strip-shaped light guide member 41 (i.e., the functional portion A and the decorative portion B) is directly visible for oncoming drivers and pedestrians through the front cover 12. Therefore, improved visibility of the clearance lamp section 40 can be achieved with only two LEDs 51, 52.

The decorative portion B is illuminated by the light emitted from the second LED 52 and entered into the light guide member 41 from the base end face (the second light entering surface 41b). The intensity of light guided inside the light guide member 41 tends to decrease as its optical path becomes longer toward the tip end side of the light guide member 41. Therefore, the light guide member 41 of the embodiment is configured such that the width and the thickness thereof becomes gradually smaller from the base end side, from which the light from the second LED 52 enters, toward the tip end side which is opposite to the base end side in the extending direction of the light guide member 41 in order to gradually reduce energy loss of the light guiding toward the tip end side of the light guide member 41. That is, the decorative portion B is configured to emit light with substantially equal brightness from the base end side to the tip end side to improve visibility of the clearance lamp section 40.

Furthermore, the light guide member 41 of the clearance lamp section 40 is attached to the extension 30 and is positioned closer to the front cover 12 than the reflector-type light source unit 21 for the upper beam and the projector-type light source unit 25 for the lower beam, which are disposed deeper inside the lamp chamber S. Therefore, the light emission from the clearance lamp section 40 (i.e., from the light guide member 41) can be clearly seen from oncoming vehicles and the pedestrians through the front cover 12.

In contrast, the upper beam and the lower beam are irradiated from the deeper positions than the clearance lamp section 40 (the light guide member 41) which emits light along the circumferential edge of the lamp chamber S near the front cover 12. Therefore, when the headlamp section 20 is turned on, a sedate, unique, and dignified, high-quality appearance is provided due to the depth effect created inside the lamp chamber S.

Third, the first and second LEDs 51, 52 are disposed such that the respective light emitting axes L1, L2 are directed in the direction along which the light guide member 41 extends. Therefore, the components of the clearance lamp section 40, i.e., the light guide member 41 and the first and second LEDs 51, 52 are disposed near the circumferential edge of the lamp chamber S and along the front cover 12, without requiring much accommodating space in the front-and-rear direction. Accordingly, the clearance lamp section 40 can be incorporated even inside the lamp chamber S having a relatively small depth.

As shown in FIGS. 2 and 3, a space Sa is provided between the light guide member 41, which is integrally attached into the circumferential edge portion of the extension 30 and extends obliquely rearward along the front cover 12, and the reflector 22 of the headlamp section 20, which is vertically arranged on the rear side of the light guide member 41. The space Sa becomes wider in the front-and-rear direction towards the base end side of the light guide member 41. The first LED 51 and the reflector 54 of the clearance lamp section 40 are disposed in this space Sa, whereby the first LED 51 and the reflector 54 is prevented from interfering with the headlamp section 20 which is vertically and horizontally tiltable. That is, the space Sa behind the light guide member 41 is effectively used as the accommodating space for the first LED 51 and the reflector 54 to reduce size of the lamp body 10, which leads to a reduction in size of the entire headlamp assembly 1.

Fourth, the first LED 51 and the second LED 52 are disposed such that the respective light emitting axes L1, L2 thereof are parallel to each other and such that the first LED 51 and the second LED 52 are disposed adjacent to each other in the front-and-rear direction. Therefore, only one reference surface is required on the bracket 56 for mounting the LEDs 51, 52. In addition, the first LED 51 and the second LED 52 are mounted on the single circuit board 53. Therefore, the number of components of the clearance lamp section 40 can be reduced, and the assembling of the components into the lamp body 10 is simplified.

Second Embodiment

Figure 7:
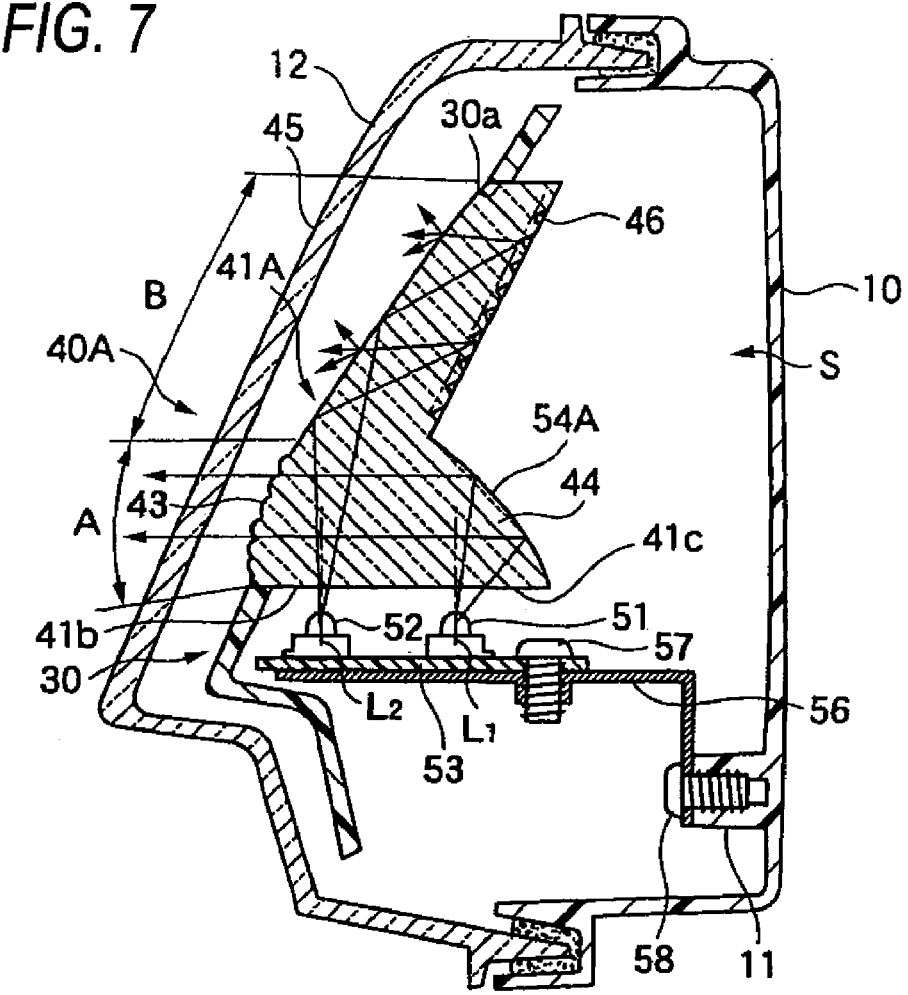
FIG. 7 is a vertical sectional view of an automotive headlamp assembly according to a second embodiment of the invention.
Figure 8:
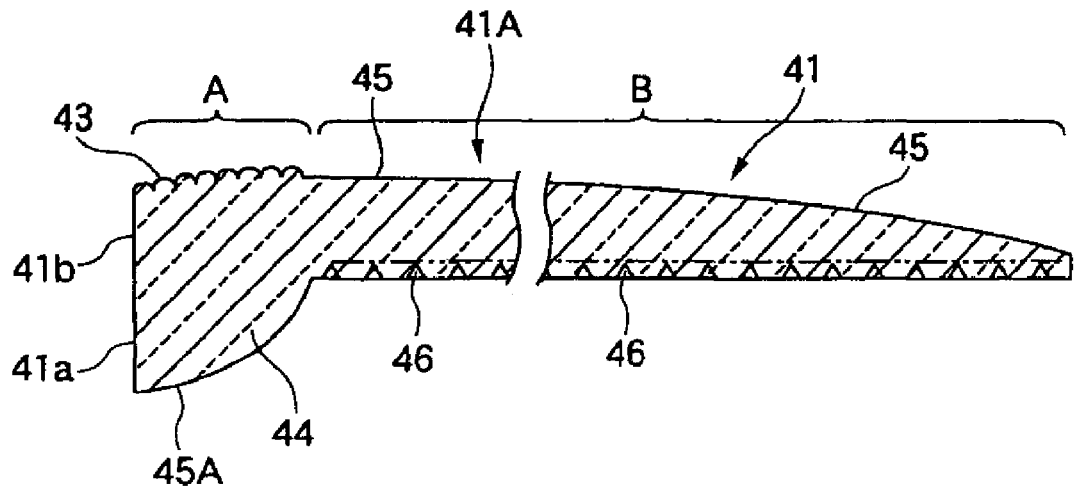
FIG. 8 is a longitudinal sectional view of a light guide member of FIG. 7.

FIGS. 7 and 8 illustrate an automotive headlamp assembly according to a second embodiment of the invention.

In the first embodiment the parabolic reflector 54, which is an optical component for guiding the light from the first LED 51 to the diffusing front surface (i.e., to the cylindrical steps 43), is provided as a separate component from the light guide member 41 and is disposed on the rear side of the light guide member 41. In the second embodiment, instead of providing a separate reflector, an internally reflecting face 54A having a parabolic shape is integrally formed on a rear portion of a light guide member 41A to guide a light from the first LED 51 to a diffusing front surface (i.e., to cylindrical steps 43).

More specifically, a bulged portion 44 having a parabolic outer circumferential surface is integrally formed on the rear portion of the light guide member 41A at a portion corresponding to the diffusing front surface having the cylindrical steps 43, i.e., the bulged portion 44 and the light guide member 41A are formed in a one-piece structure, and the internally reflecting face 54A is provided on the outer circumferential surface of the bulged portion 44 by aluminum deposition. A lower end face of the bulged portion 44 is formed to be flush with a base end face 41b of the light guide member 41A (i.e., a second light entering surface 41b). The lower end face of the bulged portion 44 facing against the first LED 51 serves as a first light entering surface 41c, from which the light from the first LED 51 enters. The first LED 51 is disposed at a focal point of the parabolic shape of the internally reflecting face 54A.

Because the other parts of the second embodiment are similar to those of the first embodiment, repetitive description thereof will be omitted and like elements are labeled by the same reference numerals.

In the second embodiment, the number of components of the clearance lamp section 40A is less than that in the first embodiment because the internally reflecting face 54A (i.e., the optical component) and the light guide member 41A are formed in a one-piece structure. Therefore, it is not necessary to consider the optical arrangement between the reflector 54, the light guide member 41 and the first LED 51 during the assembling work as in the first embodiment.

Accordingly, the configuration of the clearance lamp section 40A of the second embodiment is more simple than that of the first embodiment, and the assembling work of the components of the clearance lamp section 40 into the lamp body 10 is facilitated.

Third and Fourth Embodiments

Figure 9:
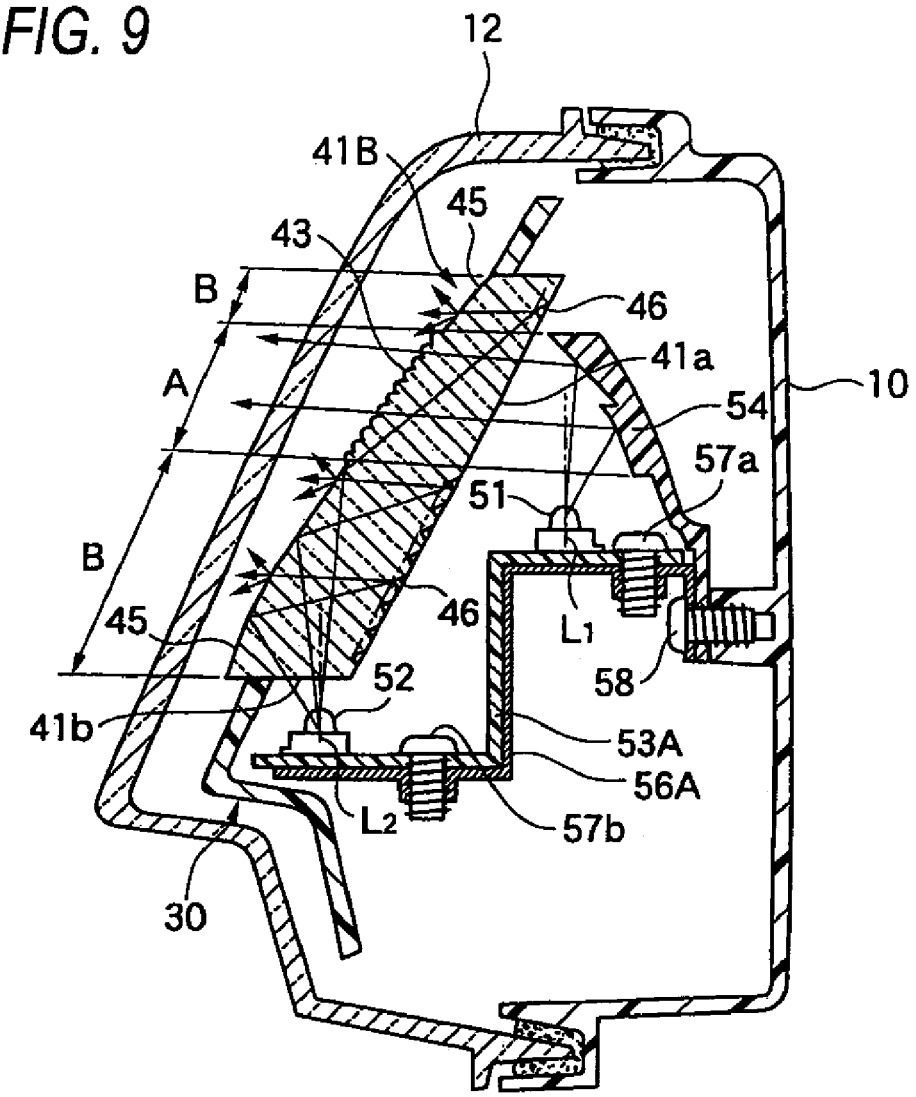
FIG. 9 is a vertical sectional view of an automotive headlamp assembly according to a third embodiment of the invention.
Figure 10:
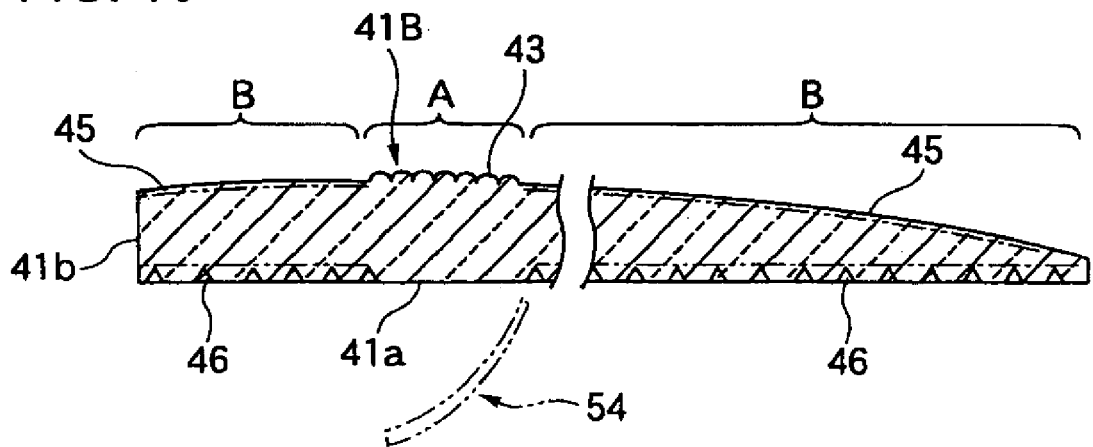
FIG. 10 is a longitudinal sectional view of a light guide member of FIG. 9.
Figure 11:
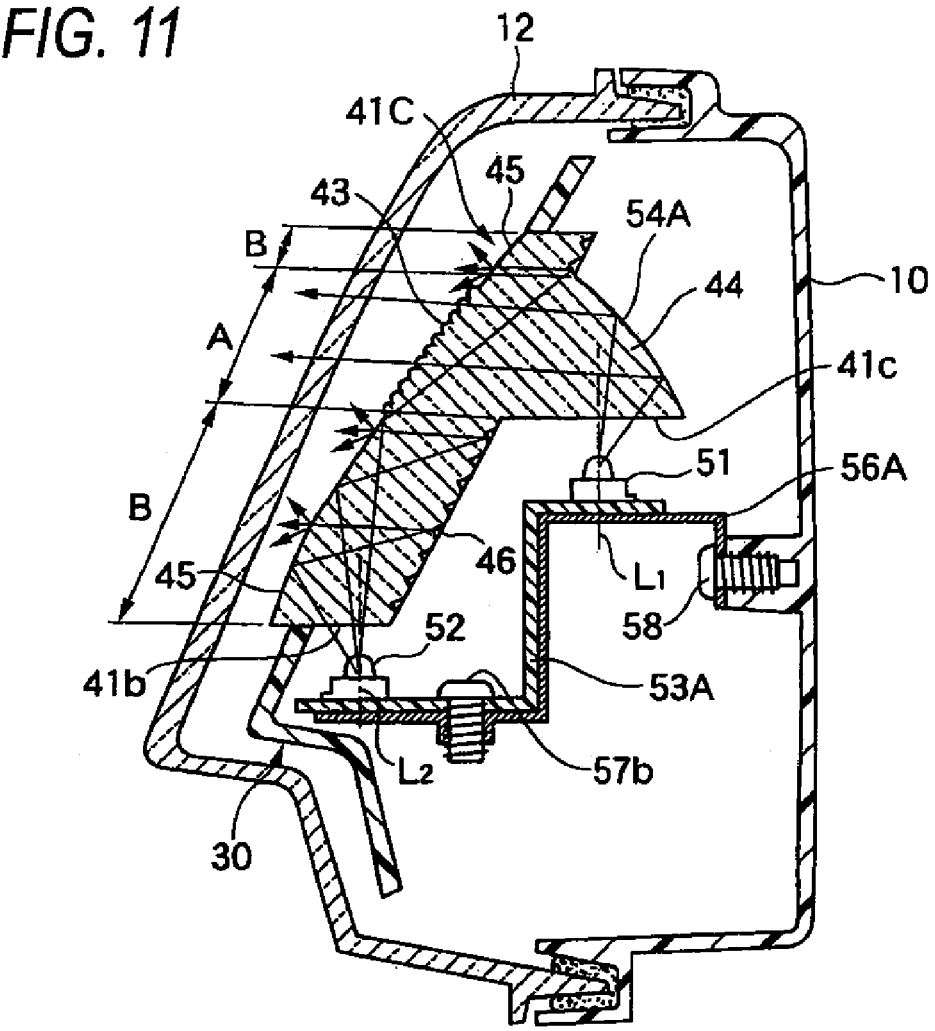
FIG. 11 is a vertical sectional view of an automotive headlamp assembly according to a fourth embodiment of the invention.
Figure 12:
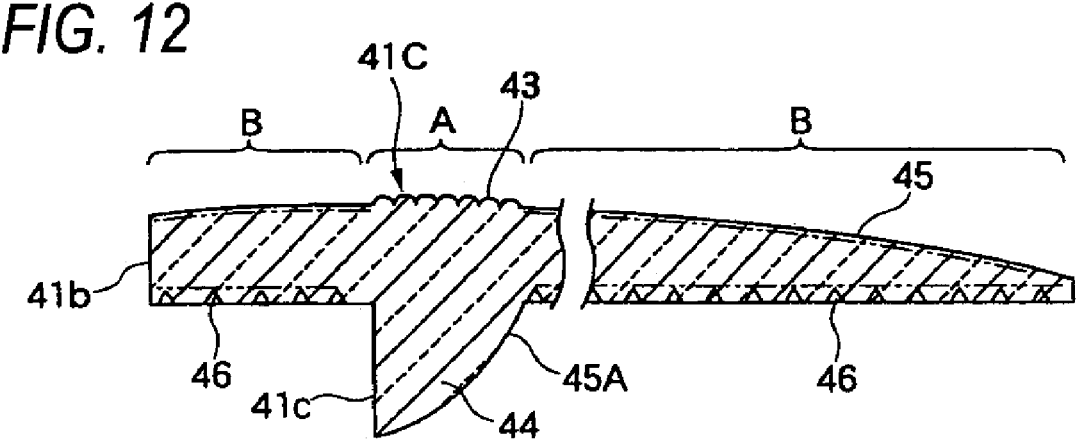
FIG. 12 is a longitudinal sectional view of a light guide member of FIG. 11.

FIGS. 9 and 10 illustrate an automotive headlamp assembly according to a third embodiment of the invention, and FIGS. 11 and 12 illustrate an automotive headlamp assembly according to a fourth embodiment of the invention.

In the first and second embodiments, the functional portion A is provided to include the base end face of the light guide member 41 (41A) of the clearance lamp section 40 (40A). In the third and fourth embodiments, a functional portion A is provided in a position which is spaced away in a longitudinal direction from a base end face of a light guide member 41B (41C) of a clearance lamp section 40B (40C), and a decorative portion B is divided into two parts on respective sides of the functional portion A in the longitudinal direction of the light guide member 41B (41C).

In the third embodiment, like the first embodiment the reflector 54 is disposed on a rear side of the light guide member 41B to guide a light from the first LED 51 to a diffusing front surface having cylindrical steps 43 on a front portion of the light guide member 41B. The first LED 51 is disposed at a focal point of the parabolic shape of the reflector 54, and the light emitted from the first LED is reflected by the reflector 54 to enter a first light entering surface 41a which is on a rear side of the cylindrical steps 43.

In the fourth embodiment like the second embodiment, a parabolic internally reflecting face 54A is integrally formed on a bulged portion 44 on a rear side of the light guide member 41C to guide a light from a first LED 51 to a diffusing front surface having cylindrical steps 43. The first LED 51 is disposed at a focal point of the parabolic shape of the internally reflecting face 54A, and the light emitted from the first LED 51 enters a first light entering surface 41c which is a lower end face of the bulged portion 44. The first light entering surface 41c is parallel to a base end face (a second light entering surface 41b) of the light guide member 41C.

In both of the third and fourth embodiments, the first LED 51 and the second LED 52 are mounted on a single flexible circuit board 53A, and the circuit board 53A is fixed to a metallic (for example, aluminum) bracket 56A, which is bent in a stepped shape, with screws 57a, 57b. The bracket 56A, with respect to which the LEDs 51, 52 fixed (together with the reflector 54 in the third embodiment), is fixed to a boss 11, which is inwardly protruded from an inner surface of a back wall of a lamp body 10, with a screw 58.

Because the other parts of the third and fourth embodiments are similar to those of the first and second embodiments, repetitive description thereof will be omitted and like element are labeled by the same reference numerals.

According to the third and fourth embodiments, the light guide member 41B, 41C includes the functional portion A in an intermediate portion thereof in the longitudinal direction, and the divided parts of the decorative portions B on respective sides of the functional portion A, interposing the functional portion A between the divided parts of the decorative portions B. Therefore, a unique illumination of the clearance lamp section 40B, 40C can be obtained.

Fifth Embodiment

Figure 13:
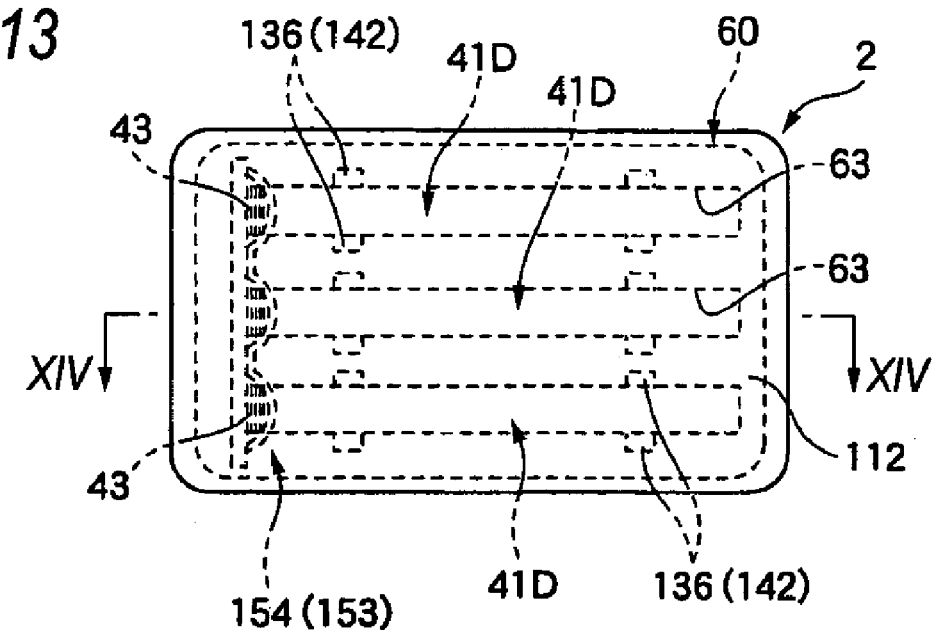
FIG. 13 is a front view of an automotive indicating lamp assembly according to a fifth embodiment of the invention.
Figure 14:
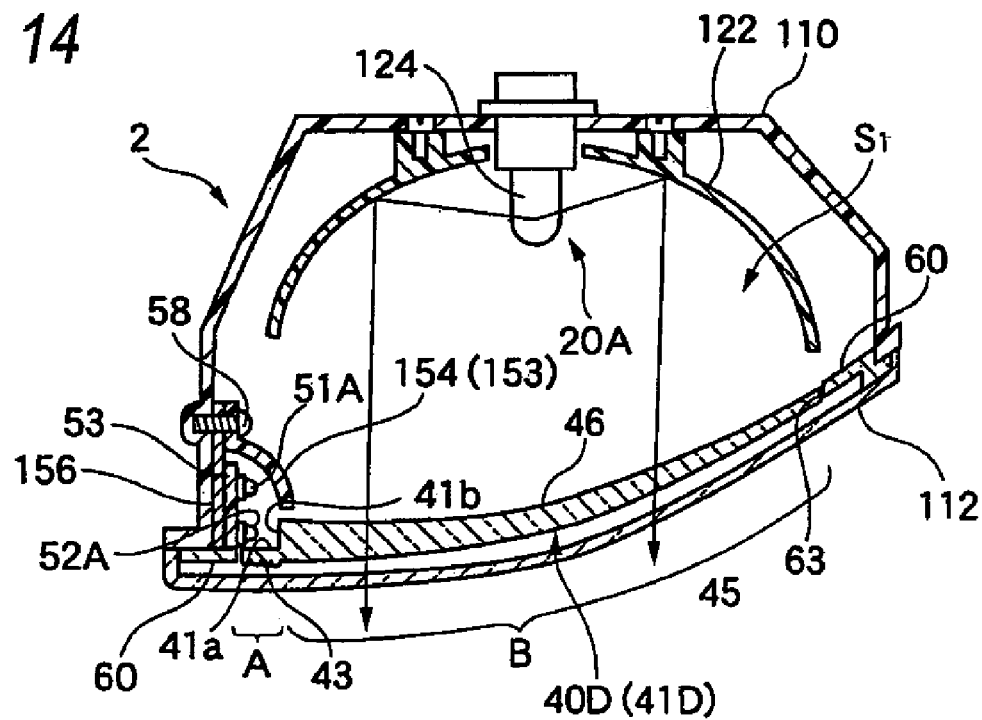
FIG. 14 is a horizontal sectional view of the indicating lamp assembly taken along the line XIV-XIV of FIG. 13.

FIGS. 13 and 14 illustrate an automotive stop lamp assembly according to a fifth embodiment of the invention.

As shown in FIGS. 13 and 14, the stop lamp assembly 2 includes a lamp body 110, a front cover 112 which forms a lamp chamber S1 together with the lamp body 110 and transmits red light, a stop lamp section 20A, a tail lamp section 40D, and a transparent inner lens 60. The stop lamp section 20A and the tail lamp section 40D are accommodated inside the lamp chamber S1. The stop lamp section 20A includes a bulb 124 and a reflector 122 which reflects a light emitted from the bulb 124.

The tail lamp section 40D includes strip-shaped light guide members 41D which are integrally attached to the inner lens 60 and which laterally extend along the front cover 112. The inner lens 60 has a rectangular shape when viewed from the front, and supports the light guide members 41D on an inner side of the front cover 112. The inner lens is configured to diffuse the light reflected by the reflector 122. The inner lens 60 may by attached to the lamp body 110 by being welded to a circumferential portion of a front opening of the lamp body 110.

The inner lens 60 is formed with three openings 63, which horizontally extend in a strip shape. On a rear surface of the inner lens 60 where the openings 63 are not formed, fish-eye steps are formed to vertically and horizontally diffuse the light reflected by the reflector 122 and transmitted through the inner lens 60.

In each of the openings 63, the corresponding light guide member 41D of the tail lamp section 40D is integrally attached from a rear side. Each of the light guide members 41D is fixed to the inner lens 60 in a similar manner as in the first embodiment in which the brackets 42 formed with the circular holes 42a and the mounting bases 36 having the boss 36a are used. That is, the light guide members 41D are fixed to the inner lens 60 using brackets 142, which are provided on opposing sides of the respective light guide members 41D and formed with a circular hole 142 respectively, and mounting bases 136, which are provided on circumferential edge portion of the openings 63 on the rear surface of the inner lens 60 and have a boss respectively.

A rear side portion of a diffusing front surface of a functional portion A having cylindrical steps 43A, i.e., a rear side portion of a base end portion of each of the light guide members 41D, is cut out to form a right angle, whereby a first light entering surface 41a, into which a light emitted from a first red LED 51A and reflected by a reflector 154 enters in a form of parallel rays, and a second light entering surface 41b, into which a light emitted from a second red LED 52A directly enters, are formed. Parabolic reflectors 154 (optical components) of the tail lamp section 40D are disposed facing against the corresponding first light entering surface 41a, and are configured as a reflector unit 153 which is fixed to the lamp body 110 with a screw 58. In the reflector unit 153, the reflectors 154 are arranged to be adjacent to each other in a vertical direction.

The second red LEDs 52A are disposed facing the second light entering surface 41a of the decorative portion B of the corresponding light guide member 41D, and are mounted on a circuit board 53 such that light emitting axes L2 thereof are parallel to light emitting axes L1 of the first red LEDs 51A. The circuit board 53, on which six LEDs 51A, 52A are mounted in total, and the reflector unit 153 are fixed to the lamp body 110 via a metallic bracket 156.

Because the other parts of the fifth embodiment are similar to those of the first embodiment, repetitive description thereof will be omitted and like elements are labeled by the same reference numerals.

According to the fifth embodiment, the light emitting surfaces of the strip-shaped light guide members 41D are directly visible for following drivers and pedestrians through the front cover 112. Therefore, improved visibility of the tail lamp section 40D can be achieved, although the light source for each of the light guide members 41D has only two LEDs 51A, 52A.

Other Embodiments

In the fifth embodiment, the parabolic reflectors 154 for guiding the light from the first red LEDs 51A toward the light distribution emitting portions (i.e., toward the cylindrical steps 43) are disposed on the rear side of the light guide members 41D as separate components from the light guide members 41D. However, for the purpose of guiding the light from the first red LEDs 51A toward the light distribution emitting portions (i.e., toward the cylindrical steps 43), a bulged portion 44 formed with parabolic internally reflecting faces 54A as shown in FIGS. 7 and 8 may be provided instead of the reflectors 154. In such a case, the bulged portion 44 and the corresponding one of the light guide members 41D can be formed in a one-piece structure.

In the fifth embodiment, in order to obtain a red color which is required as a function of the stop lamp, the light from the bulb 124, which is white, is transmitted through the red light transmissive front cover 112. However, a red cap (not shown) may be provided to surround the bulb 112 to obtain a red light emission from the bulb 112 so that the front cover 112 may be a colorless transparent cover.

In the fifth embodiment, a stop lamp assembly is presented as one example of an indicating lamp assembly. However, one or more embodiments of the present invention can also be applied to other types of indicating lamp assemblies. For example, an indicating lamp assembly to which one or more embodiments of the present invention is applicable may have functions of a turn signal lamp and a clearance lamp by utilizing the bulb 124 and the reflector 122 as components of a turn signal lamp section and by utilizing the light guide members 41D and LEDs 51, 52 as components of a clearance lamp section. Also, in such a case, the two lamp sections are accommodated in the same lamp chamber S1.

In the first to fifth embodiments, the first LED 51 and the second LED 52 are disposed such that the respective light emitting axes L1, L2 are parallel to each other. However, the first and second LEDs 51, 52 may be arranged such that the light emitting axes L1, L2 are orthogonal to each other. For example, the embodiments shown in FIGS. 3 and 9 may be modified such that the first LED 51 and the reflector 54 are rotated by 90 degrees around an axis parallel to the front-and-rear direction while maintaining the reflector 54 to face against the first light entering surface 41a.

Furthermore, the embodiment shown in FIG. 3 may be modified such that the first LED 51 is oriented to face the first light entering surface 41a of the light guide member 41, i.e., such that the light emitting axis L1 of the first LED 51 is forwardly directed. In this modified example, instead of providing the reflector 54, a convex lens or a Fresnel lens is disposed between the first LED 51 and the light entering surface 41a, and the first LED 51 is disposed at a focal point of the convex lens or the Fresnel lens. According to this configuration, the convex lens or the Fresnel lens serves as an optical component which collimates the light from the first LED 51 toward the light entering surface 41a.

Furthermore, the convex lens or the Fresnel lens of the modified example described above may be integrally provided on a rear side portion of the functional portion A to be a part of a one-piece structured light guide member 41. In such an example, because the convex lens or the Fresnel lens does not need to be provided as a separate component, the configuration of the clearance lamp section is simplified, and the assembling work of components of the clearance lamp section into the lamp body 10 is also simplified.

While description has been made in connection with embodiments and examples of the present invention, those skilled in the art will understand that various changes and modification may be made therein without departing from the present invention. It is aimed, therefore to cover in the appended claims all such changes and modifications falling within the true spirit and scope of the present invention

What is claimed is:

1. A vehicle lamp assembly comprising:
   a lamp body;
   a front cover which forms a lamp chamber together with the lamp body;
   a first lamp section comprising a light source and a reflector which reflects light from the light source; and
   a second lamp section comprising a first light emitting device, a second light emitting device, a light guide member, and an optical component,
   wherein the first lamp section and the second lamp section are disposed inside the lamp chamber,
   wherein the light guide member comprises:
       a base end face from which the light guide member extends in a strip shape along the front cover;
       a functional portion comprising a diffusing front surface which diffusely emits light from the first light emitting device; and
       a decorative portion comprising an internally reflecting rear surface which reflects light from the second light emitting device toward the front cover,
   wherein a light emitting area of the decorative portion is larger than a light emitting area of the functional portion,
   wherein the optical component is disposed on a rear side of the functional portion to guide the light from the first light emitting device toward the diffusing front surface, and
   wherein the second light emitting device is disposed such that the light emitted therefrom is incident on the base end face of the light guide member.

2. The vehicle lamp assembly according to claim 1, wherein the light guide member is closer to the front cover than the first lamp section.

3. The vehicle lamp assembly according to claim 1, wherein the first and second light emitting devices are oriented in a same direction.

4. The vehicle lamp assembly according to claim 1, wherein the light guide member and the optical component are formed in a one-piece structure.

5. The vehicle lamp assembly according to claim 1, wherein the optical component collimates the light from the first light emitting device.

6. The vehicle lamp assembly according to claim 1, wherein the optical component comprises a parabolic reflector.

7. The vehicle lamp assembly according to claim 1, wherein the diffusing front surface comprises cylindrical steps.

8. The vehicle lamp assembly according to claim 1, wherein the internally reflecting rear surface comprises stippled dots.

9. The vehicle lamp assembly according to claim 1, wherein the second lamp section further comprises a circuit board shared by the first and second light emitting devices.

10. The vehicle lamp assembly according to claim 1, wherein a cross sectional area of the decorative portion is gradually decreased as a distance from the second light emitting device becomes longer.

11. The vehicle lamp assembly according to claim 1, further comprising:
    an aiming mechanism which tiltably supports the first lamp section on the lamp body; and
    an extension disposed inside the lamp chamber to surround the first lamp section, and
    the light guide member is attached to a circumferential portion of the extension.

12. The vehicle lamp assembly according to claim 11, wherein the extension is formed with an opening inside which the light guide member is disposed.

13. The vehicle lamp assembly according to claim 1, further comprising an inner lens disposed inside the lamp chamber to diffuse the light reflected by the reflector of the first lamp, wherein the light guide member is attached to the inner lens.

14. The vehicle lamp assembly according to claim 13, wherein the inner lens is formed with an opening inside which the light guide member is disposed.

15. A vehicle lamp assembly comprising:
    a lamp body;
    a front cover which forms a lamp chamber together with the lamp body;
    a first lamp section comprising:
        a light source; and
        a reflector which reflects light from the light source;
    a second lamp section comprising:
        a first light emitting device;
        a second light emitting device oriented in a same direction as the first light emitting device;
        a circuit board shared by the first and second light emitting devices;
        a light guide member comprising:
            a base end face from which the light guide member extends in a strip shape along the front cover;
            a functional portion comprising a diffusing front surface which diffusely emits light from the first light emitting device, wherein the diffusing front surface comprises cylindrical steps; and
            a decorative portion comprising an internally reflecting rear surface which reflects light from the second light emitting device toward the front cover, wherein the internally reflecting rear surface comprises stippled dots,
        wherein a light emitting area of the decorative portion is larger than a light emitting area of the functional portion,
        wherein a cross sectional area of the decorative portion is gradually decreased as a distance from the second light emitting device becomes longer; and an optical component, which collimates the light from the first light emitting device, disposed on a rear side of the functional portion to guide the light from the first light emitting device toward the diffusing front surface, the optical component comprising a parabolic reflector, wherein the light guide member and the optical component are formed in a one-piece structure, and wherein the second light emitting device is disposed such that the light emitted therefrom is incident on the base end face of the light guide member, wherein the first lamp section and the second lamp section are disposed inside the lamp chamber, and wherein the light guide member is closer to the front cover than the first lamp section.

16. The vehicle lamp assembly according to claim 15, further comprising:

an aiming mechanism which tiltably supports the first lamp section on the lamp body; and an extension disposed inside the lamp chamber to surround the first lamp section, and the light guide member is attached to a circumferential portion of the extension.

17. The vehicle lamp assembly according to claim 16, wherein the extension is formed with an opening inside which the light guide member is disposed.

18. The vehicle lamp assembly according to claim 15, further comprising an inner lens disposed inside the lamp chamber to diffuse the light reflected by the reflector of the first lamp, wherein the light guide member is attached to the inner lens.

19. The vehicle lamp assembly according to claim 18, wherein the inner lens is formed with an opening inside which the light guide member is disposed.

* * * * *